Figure 1:
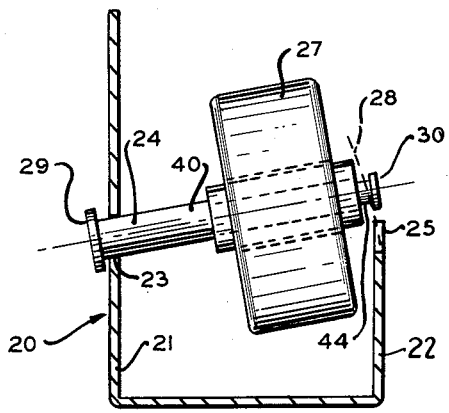

May 9, 1961　　　C. A. DE FLORA ET AL　　　2,983,352
WHEEL CONVEYOR

Filed Sept. 29, 1959　　　　　　　　　　　　　　3 Sheets-Sheet 1

INVENTORS
C. A. DE FLORA &
BY G. H. BENSEN

ATTORNEY

May 9, 1961  C. A. DE FLORA ET AL  2,983,352
WHEEL CONVEYOR
Filed Sept. 29, 1959  3 Sheets-Sheet 2
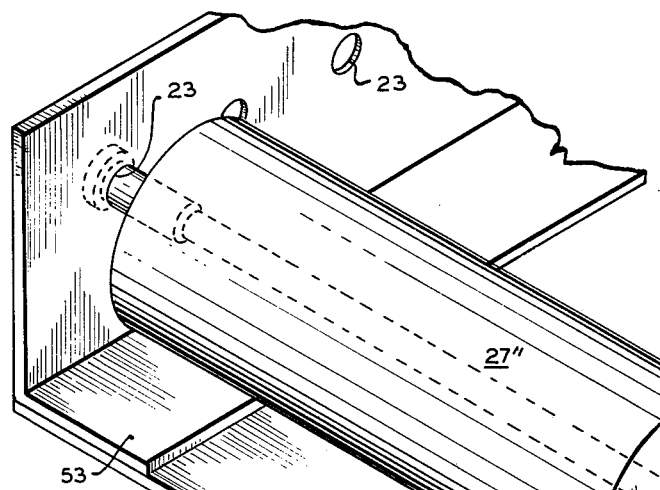
FIG. 7
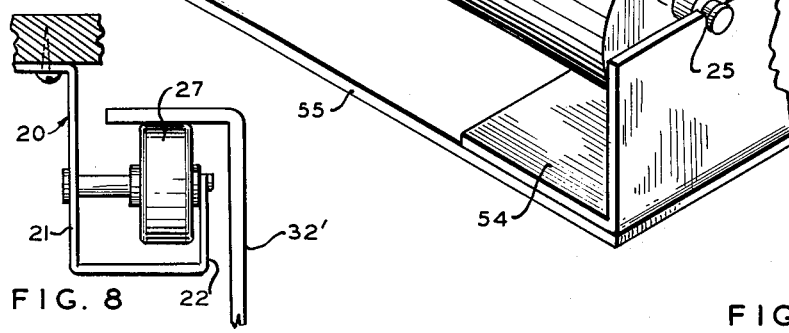
FIG. 8  FIG. 9
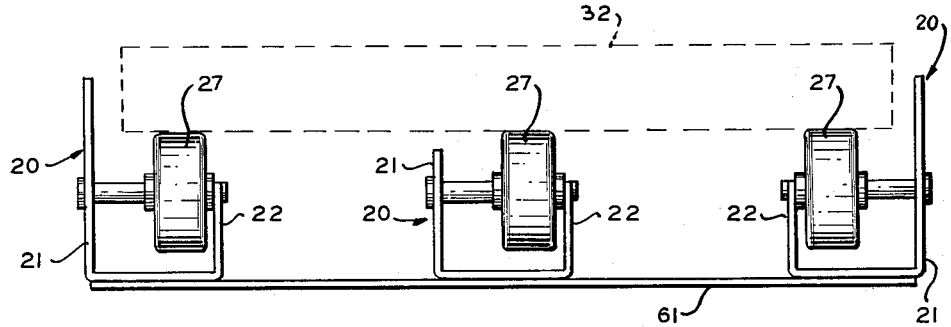
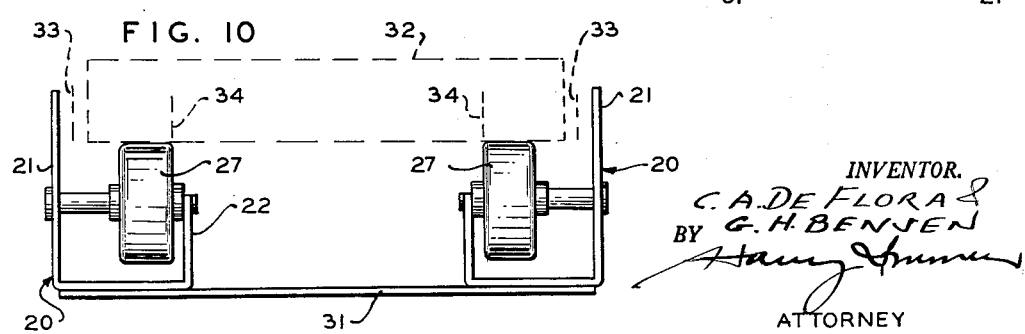
INVENTOR.
C. A. DE FLORA &
BY G. H. BENJEN
ATTORNEY

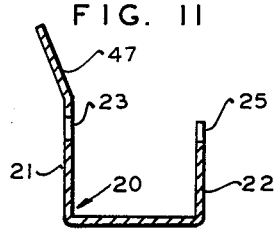
FIG. 11
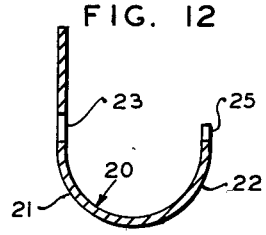
FIG. 12
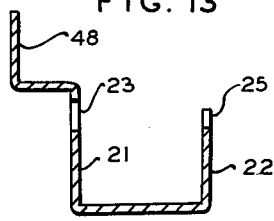
FIG. 13
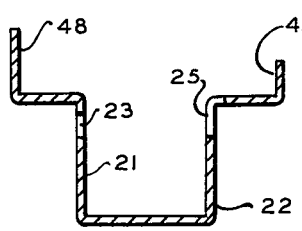
FIG. 14
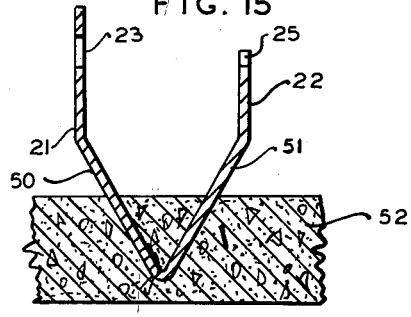
FIG. 15
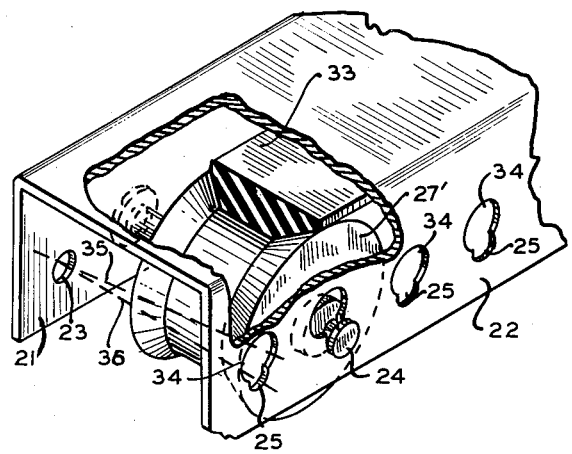
FIG. 16 / FIG. 17
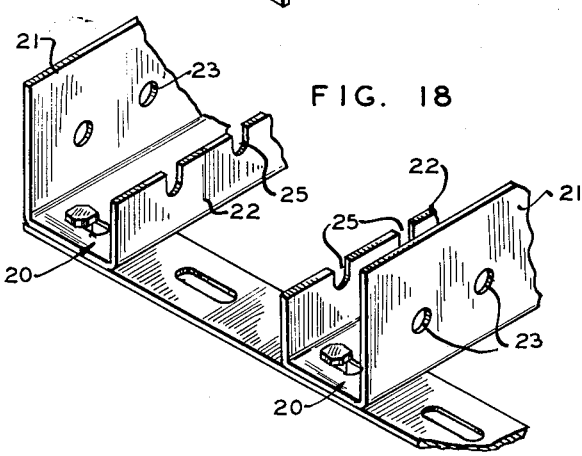
FIG. 18
INVENTOR.
C. A. DE FLORA &
BY G. H. BENSEN
ATTORNEY United States Patent Office 2,983,352
Patented May 9, 1961

2,983,352
WHEEL CONVEYOR

Caesar A. De Flora, Westwood, and George H. Bensen, Tenafly, N.J. (both % Engineered Equipment Associates, 336 Hudson St., Hackensack, N.J.)

Filed Sept. 29, 1959, Ser. No. 843,279

14 Claims. (Cl. 193—35)

This invention relates to a novel construction of wheel conveyors fabricated as a standard unit which may be readily adjusted and modified without use of tools, to varying requirements of use and assembled and disassembled without use of tools, nuts, rings, rivets, retaining caps or other separate attachment devices.

The drawings, illustrating procedures and devices useful in carrying out the invention, and the description below are exemplary only of the invention, which shall be deemed to cover all other devices and procedures coming within the scope and purview of the appended claims.

Figure 2:
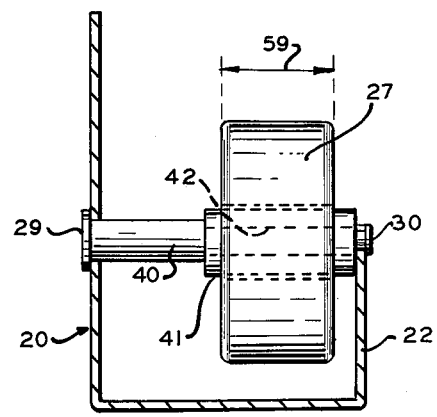
Figure 3:
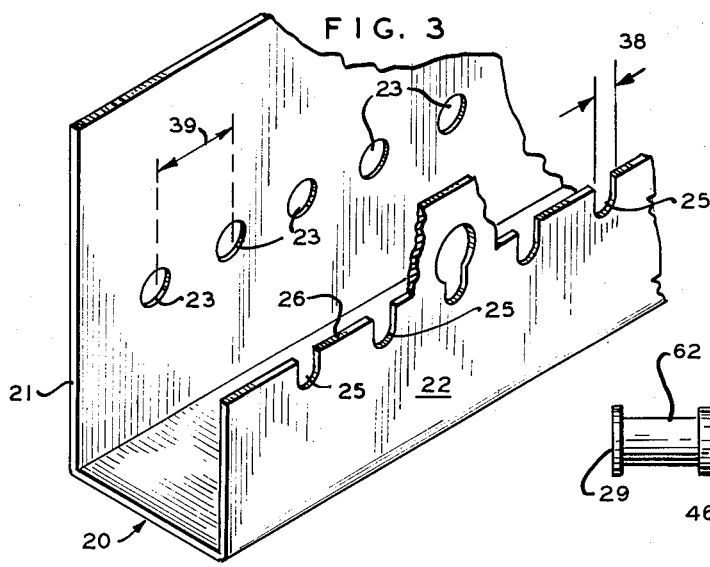
Figure 5:
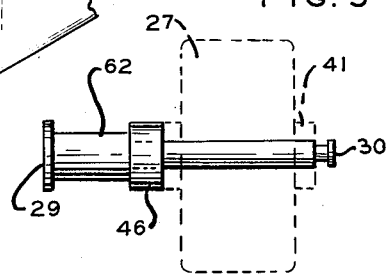
Figure 6:
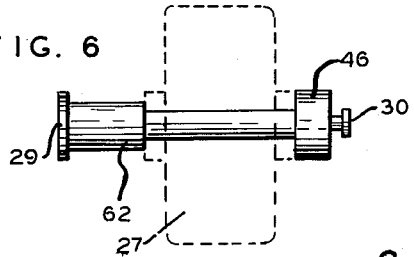
Figure 4:
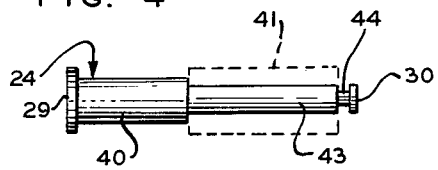

In the drawings, wherein similar reference characters indicate like parts:

Fig. 1 is a vertical, sectional view of a wheel conveyor embodying the invention, shown as initially partially positioned in the support frame, Fig. 2 is a similar view, showing the wheel fully positioned in the support frame, Fig. 3 is a perspective view of a support frame embodying the invention, Fig. 4 is an elevational view of a pin embodying the invention, showing, in dotted lines, the wheel hub 41 to be positioned thereon (as in Fig. 2), Figs. 5 and 6 are similar views of pins having shorter portions 40 immediately adjacent the first head 29 thereof and provided with spacers 46 which, combined with the hub portion of the wheel, provide the desired relative location of the wheel to the first head 29 of the pin, Fig. 7 is a fragmentary perspective view of an elongated wheel or roller 27″, positioned in a support frame, embodying the invention, Fig. 8 is an end elevational, partly fragmentary view showing use of the wheel conveyor of the invention, Figs. 9 and 10 are similar views exemplifying other uses, Figs. 11–15 are vertical, sectional views of other forms of support frames embodying the invention, Fig. 16 is a fragmentary, perspective view showing use of the invention with the rail 21 inverted, and Fig. 17 is a fragmentary, perspective view of another form of support frame embodying the invention.

Fig. 18 is a fragmentary perspective view exemplifying another form of support frame embodying the invention.

As shown in the drawing, the wheel conveyor of this invention comprises an elongated support frame 20 (Fig. 1) consisting of first and second parallel wall members 21, 22, the first wall member 21 being provided with an aperture to receive the pin 24 (as below more particularly described) and the second wall member being provided with a recess 25 of smaller width in the axial plane of the rail 20 than the diameter of aperture 23, said recess being aligned with the aperture and being in open communication with the top 26 of the wall member 22. The elongated pin 24 is provided for insertion through the aperture 23 initially and through the hub 41 of conveyor wheel 27 thus mounted on the pin and is initially angularly positioned (Fig. 1) above the recess slot, or opening 25. The pin and carried wheel are then rotated downwardly through the arc 28 to (Fig. 2) snap the pin 24 into slot 25, with the first and second heads 29, 30 of the pin positioned against the outer faces of the wall members 21, 22, securing the parts in operative position. They may be removed by reversing the procedure.

By providing (Figs. 10 and 18) two of the units 20 secured to a suitable plate or support 31 maintaining the units apart the desired distance, articles 32 (Fig. 10) having widths intermediate the inner ends 34 of wheel 27 and points immediately adjacent the inner faces of walls 21 (as at 33) may be accommodated.

The invention is useful as a gravity conveyor mounted on a floor (which may be assumed to be represented at 31 in Fig. 10), or hung as in Fig. 8 wherein the article 32′ is a bracket engaging the wheel 27 which serves as an overhead rail. In the form shown in Fig. 16, the wheel 27′ is part of an overhead belt system and is engaged by belt 33 or the like; the pin 24 is initially positioned through aperture 23 of first wall member 21, through the wheel hub and the key shaped portion 34 of recess 25, and is then moved from the plane 35 to aligned position (plane 36) with the slot 25 as shown in full lines. The parts are so proportioned that the pin 24 will snap into the slot 25 from the Fig. 1 to the Fig. 2 position along the arc 28 for frictional engagement.

Where the units 20 are spaced as in Fig. 10 to support articles 32, intermediate units 20 may be provided (Fig. 9) wherein the wall members 21, 22 do not extend above the wheel 27 (in the Figs. 1 and 2 forms, the first wall member is shown extended above the wheel).

Pursuant to the invention, apertures 23 are provided axially equidistantly along the second wall member 21, the distance from center to center (indicated at 39, Fig. 3) between adjacent apertures 23 being a predetermined unit of measurement—as, for example, one inch. The recesses 25 in the second wall members 22 are correspondingly spaced. Pursuant to the invention therefore, the frame 20 may be formed as a standard unit with the apertures 23 and recesses 25 adapting it to be used, for example, to dispose a wheel in each aperture and slot or in every other aperture and slot or with two or more apertures and slots intermediate those used. By this arrangement the frame 20 may be furnished as a standard length for application as required, the pins and wheels being inserted at the required aperture and slot positions. The device is thus readily adapted to be made as a standard unit adapted to be readily accommodated to a variety of uses requiring the spacing of the wheels at various distances center to center.

The portion 40 (Fig. 4) of the pin 24 immediately adjacent the first head 29 thereof is of smaller diameter than the aperture 23, so that the pin may be freely inserted through the aperture and the first head 29 of the pin positioned against the outer face of first wall member 21 (Fig. 2). The wheel hub 41 is apertured at 42 to freely rotatably mount the wheel on the pin or said hub may be splined or keyed to the pin. The pin is provided, immediately adjacent the second head 30, with a groove 44 of the same diameter as the width 38 of the slot 25 (Fig. 3) so as to enable the grooved portion of the pin to be freely slidable (Figs. 1 and 2) into the slotted portion of the wall 22 after positioning the pin through the aperture of the first wall and through the wheel hub. The pin portion 40 is of greater diameter than the hub aperture and the pin, intermediate the portion 40 and groove 44 thereof, is formed of the same diameter (43, Fig. 4) as the hub aperture 42 so that the hub 41 may be readily positioned thereon and against the portion 40 of the pin, the portion 40 serving as a stop for that side of the wheel, the inner face of the wall 22 serving as the stop for the other side of the wheel.

The arrangement of the units 20 as shown in Fig. 10 accommodates objects 32 whose outer dimensions extend between the lines 34 to 33. The invention is highly versatile. If desired, pin portion 40 may be shortened to a lesser distance than required to take up the spacing between the pin-groove 44 and the enlarged first head 29 of the pin. As shown in Fig. 5, wherein the thus shortened portion 40 is designated at 62, a spacer 46 may be interposed intermediate the wheel hub 41 and the portion 62 of the pin (Fig. 5) or (Fig. 6) between the hub 41 and the pin groove 44. The location of the wheel may thus be varied if so desired.

In Figs. 11–15 the invention is shown adapted to a support frame 20 of other than the U-shaped form shown in Figs. 1–10. In the Figs. 11, 12 and 13 forms, the other of the pair of frames may be of corresponding and mirror image form. In Fig. 11, the wall 21 of the frame 20 is provided with an upper end portion 47 angularly directed to thereby provide wider and angular contact where desired, between the articles 32 supported by the wheel and the frame 20.

In Fig. 12, instead of being generally rectangular (Fig. 1) the frame 20 is formed J-shaped. In Fig. 13 the first wall 21 is outwardly stepped as at 48 at its upper portion to provide wider space and to further guide the articles conveyed. In Fig. 14 the first and the second wall members 21 and 22 are widened with offset portions 48, 49. In the Fig. 15 form, the lower portions 50, 51 of the first and second wall members 21, 22 are directed toward each other to define a V which form is useful for example, for anchoring frame 20 in cement or other supporting foundation 52.

In the Figs. 1 and 2 forms, the frame 20 is shown formed unitarily; in the Fig. 7 form, it is formed of two L-shaped parts 53, 54 secured in spaced parallel relation on a support or third plate 55. In the Fig. 17 form, the frame 20 is formed of the two parts 56, 57 which are respectively L-shaped and U-shaped as shown.

The circumferential width of wheel 27 may be varied to enable a single wheel to be utilized instead of a pair of wheels to provide the desired support for the article to be conveyed, as in Fig. 7, wherein the single wheel 27″ extends the substantially greater distance required to support the article 32. The only aperture that is larger than the pin diameter is aperture 23 to allow for lateral movement of the pin once it is moved through the aperture 23. The diameter of the portion 43 (Fig. 4) of the pin 24 may be the same as that of the aperture in the hub 41 of wheel 27; the groove 44 is preferably identical in size to the width of slot 25. It is not necessary for portion 43 of the pin to be smaller to fit the aperture in the wheel hub 41 where the wheel is provided with ball bearings so that the hub will not rotate around the pin.

Having thus described our invention, what we claim as new and desire to secure by Letters Patent is:

1. In a wheel conveyor, an elongated support frame comprising a pair of spaced, parallel wall members, the first wall member being provided with an aperture and the second wall member being provided with an opening of smaller width than the diameter of said aperture, said opening being aligned with the aperture, an elongated pin having a first head at one end of greater diameter than the aperture, a second head at the other end of the pin of smaller diameter than the aperture and of larger diameter than the opening, and the portion of the pin immediately adjacent the first head being of smaller diameter than the aperture, so that the pin may be freely inserted through the aperture, and the first head of the pin positioned against the outer face of the first wall member, a wheel to be mounted on the pin and to be supported thereby, said wheel having a medial hub therein, said hub being apertured therethrough to mount the wheel on the pin, said portion of the pin so immediately adjacent said first head thereof being of less diameter than the aperture in the first wall member and being of greater diameter than the diameter of the aperture through the hub so that the hub will abut said portion of the pin as a stop for the wheel at that side of the wheel, said pin being provided, immediately adjacent the second head, with a groove to enable the grooved portion of the pin to be freely slidable into the opening of the second wall after positioning the pin through the aperture of the first wall and through the wheel hub.

2. In a wheel conveyor as set forth in claim 1, said first wall member extending substantially above the wheel and said second wall member, so having the opening terminating substantially at the line of the hub portion of the wheel when the parts are assembled.

3. In a wheel conveyor as set forth in claim 1, said support frame being provided with additional apertures and openings spaced equidistantly and corresponding with the first mentioned apertures and openings for selective interengagement of the apertures and openings to provide predetermined desired spacings of the wheels and pins in the frame member.

4. In a wheel conveyor as set forth in claim 1, the first wall member and the said second wall members extending substantially below the top of the wheel on such assembly of the parts.

5. In a wheel conveyor as set forth in claim 1, said portion of the pin adjacent the enlarged first head of the pin, of greater diameter than the diameter of the aperture through the hub, being of a less length, when added to the length of the hub portion of the wheel, than the distance between the first head and the groove in the pin, and a spacer provided to be movably positioned on the reduced portion of the pin inserted through the wheel hub, said spacer being of a length equal to such lesser distance.

6. In a wheel conveyor as set forth in claim 1, the first wall of the frame member, above the aperture therein, being offset.

7. In a wheel conveyor as set forth in claim 1, said frame member being generally U-shaped cross section.

8. In a wheel conveyor as set forth in claim 1, said frame member being of J-shaped cross section.

9. In a wheel conveyor as set forth in claim 1, the upper portion of the first wall of the frame member being stepped outwardly.

10. In a wheel conveyor as set forth in claim 1, the upper portions of the first and second walls of the said frame member being stepped outwardly.

11. In a wheel conveyor as set forth in claim 1, said first and second wall members comprising plates, so provided with said aperture and slot, and a means securing said plates together in spaced parallel relation.

12. In a wheel conveyor as set forth in claim 11, said second plate being U-shaped, said slots being so provided at the inner wall of said U-shaped plate member.

13. In a wheel conveyor as set forth in claim 1, said second wall member being provided with key shaped slots, the medial portion of said key shaped slots being aligned with the apertures of the first wall member.

14. In a wheel conveyor as set forth in claim 1, said means on said pin of such greater diameter than the diameter of the aperture through the hub comprising stop means on the pin spaced from the portion of less diameter, said stop means being of greater diameter than the said diameter of the aperture through said hub so that said hub will so abut said stop means at that side of the wheel.

References Cited in the file of this patent

UNITED STATES PATENTS 1,919,495    Allen _____ July 25, 1933
2,172,379    Harris _____ Sept. 12, 1939